Figure 1:
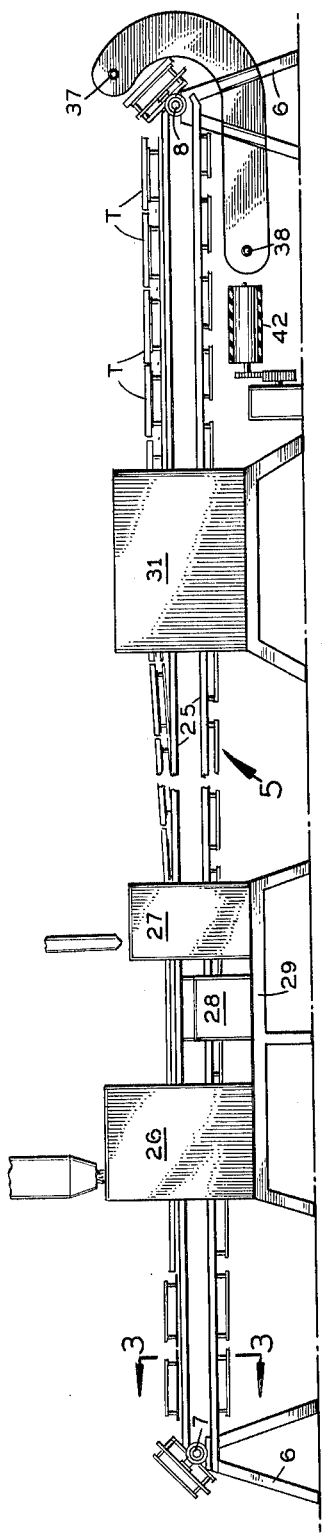

June 28, 1966  G. W. LANG  3,257,701
TILE MACHINE

Filed Jan. 27, 1964                                    5 Sheets-Sheet 1

INVENTOR.
GUS W. LANG
BY
AT TORNEY

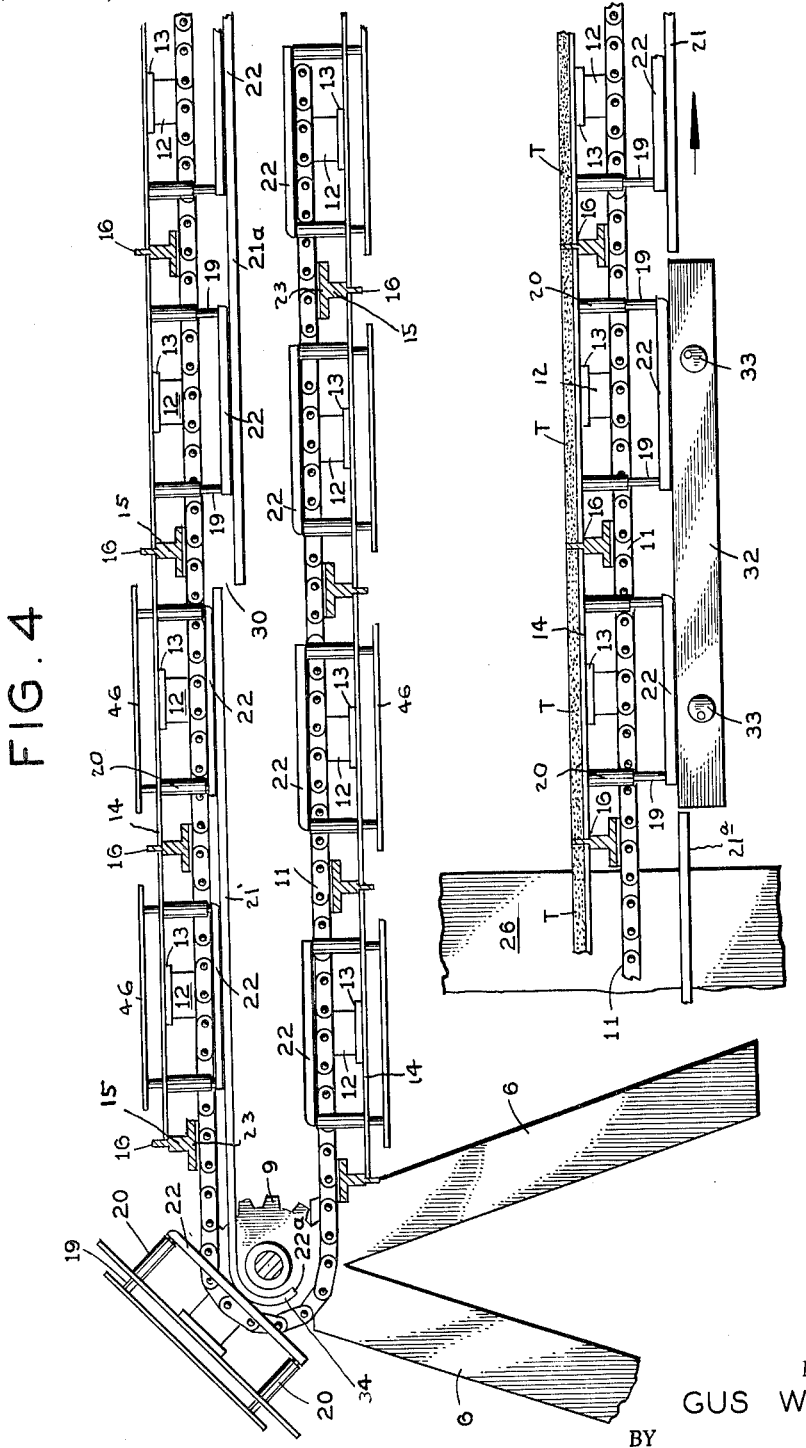

INVENTOR.
GUS W. LANG
BY
ATTORNEY

INVENTOR.
GUS W. LANG
BY
ATTORNEY

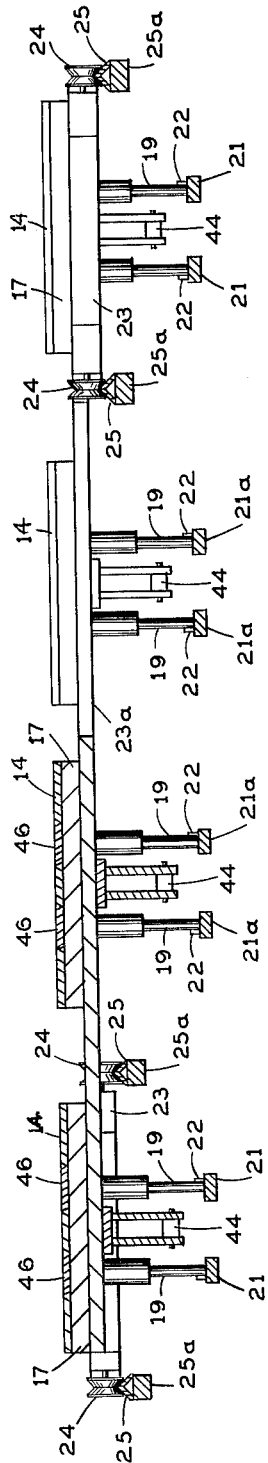

United States Patent Office
3,257,701
Patented June 28, 1966

3,257,701
TILE MACHINE
Gus W. Lang, Hollywood, Fla., assignor to
Thomas O. Brown, Jr., Hollywood, Fla.
Filed Jan. 27, 1964, Ser. No. 340,376
3 Claims. (Cl. 25—99)

This invention relates to a continuously operating machine for molding mastic tile or the like.

The invention is an improvement over my co-pending application Serial No. 269,678, filed April 1, 1963, now Patent No. 3,176,372 and provides a molding machine having endless chain conveyors that are arranged in parallel relation and slightly spaced apart and with the conveyor chains adapted to traverse geared sprockets at either end of the machine and with the sprockets being open common drive shafts whereby all of the chain conveyors are driven simultaneously.

The invention contemplates multiple pallets carrying conveyors and with the conveyor chains of each conveyor being supported upon a rigid frame that extends transversely of the machine and with the outermost conveyors and the frame being guided upon parallel rails and whereby the outermost conveyors and their pallets while being engaged with the trackways, simultaneously support and drive the inner conveyors and whereby multiple tiles or the like are formed and conveyed through the machine for discharge upon an arcuate take-off belt that is driven at a speed similar to the speed of the drive for the chains and with the take-off belt extending beneath the machine for depositing finished tile or the like upon a transverse take-off endless conveyor.

The invention further contemplates means for elevating the tile progressively from the pallet so that, when the tile reaches the discharge end of the machine, they will have been elevated to such an extent that, as the pallet moves around the discharge end shaft, the tile will be deposited upon the arcuate conveyor.

The means for elevating the tile from the pallets comprise elevating rods that are guided through tubular bearings carried by the pallet and with longitudinally spaced rods for each pallet being connected at their lower ends by a connecting bar that prevents any tendency for the rods to bind with respect to their bearings and with the elevating rods being guided upon trackways that extend longitudinally of the machine.

Novel features of construction and operation of the device will be more clearly apparent during the course of the following description, reference being had to the accompanying drawings wherein has been illustrated the preferred forms of the device and wherein like characters of reference are employed to denote like parts throughout the several figures.

Figure 3:
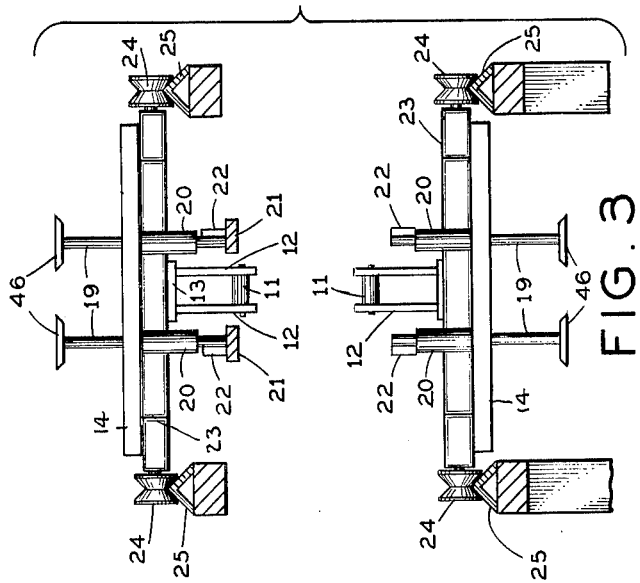
Figure 2:
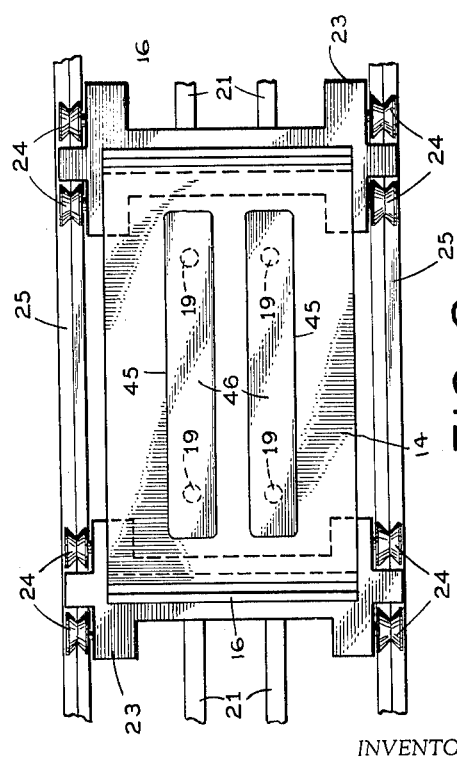
Figure 6:
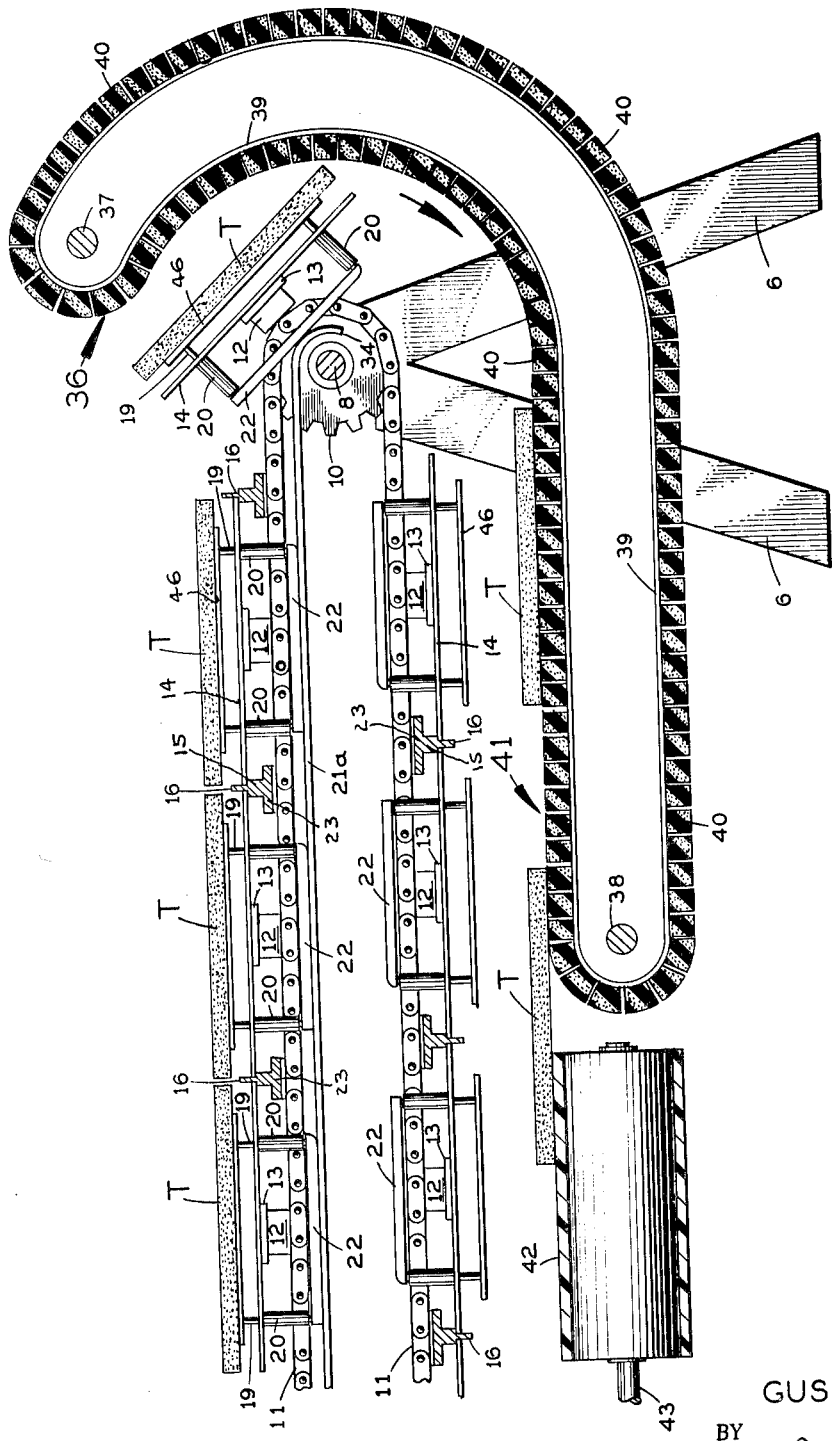
Figure 7:
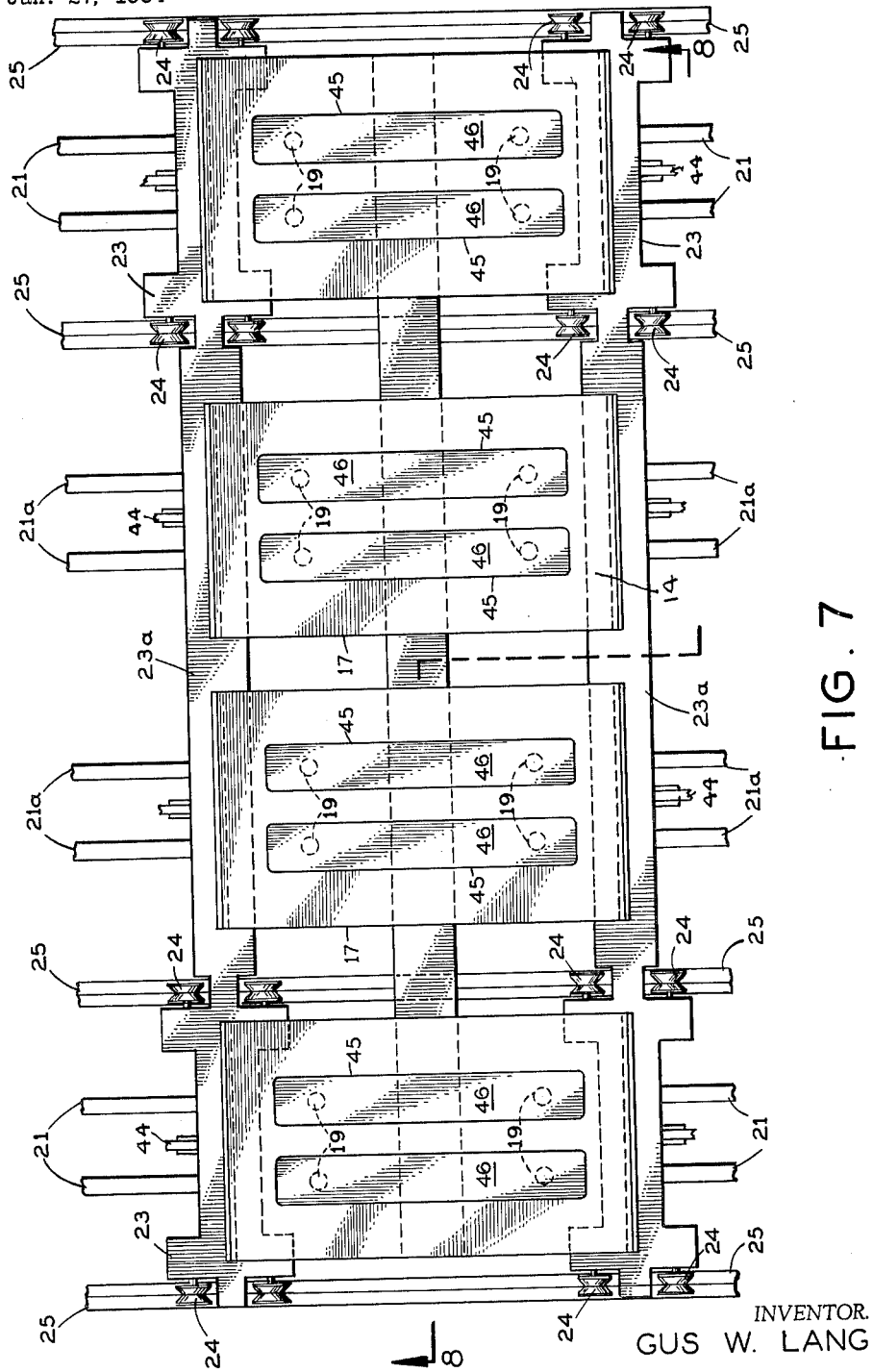

In the drawings:

FIGURE 1 is a side elevation of a machine constructed in accordance with the invention, FIGURE 2 is a plan view illustrating one carriage device that supports the pallets, FIGURE 3 is a section taken substantially on line 3—3 of FIGURE 1, FIGURE 4 is a fragmentary longitudinal section taken through the machine at the entrance end of the conveyor chains and the pallets and illustrating the traverse position of each pallet carrier as it travels around a rear drive shaft, FIGURE 5 is a fragmentary longitudinal section through the pallets after they have passed from beneath a filling hopper and illustrating a vibrator that is positioned in the link of the trackways for the pallets, FIGURE 6 is a longitudinal section through the discharge end of the machine illustrating the pallets and the molded tile in elevated position for discharge upon an arcuate conveyor, FIGURE 7 is a fragmentary top plan view illustrating multiple trackways and multiple pallets for simultaneously molding a multiplicity of tile, and FIGURE 8 is a transverse section taken substantially on line 8—8 of FIGURE 7.

Referring specifically to the drawings and particularly to FIGURE 1 there has been illustrated a tile forming machine, indicated as a whole by the numeral 5. The machine is provided at its opposite ends with supporting members 6 carrying cross shafts 7 and 8, and with the cross shafts being provided with sprocket gears 9 and 10, driving linked conveyor chains. Either shaft may be power driven.

Fixed to the chain 11 at predetermined links, are plates 12, having a head portion 13 that is welded or otherwise fixed to the underside of the pallets 14. Carriages 23, having grooved wheels 24 are supported upon spaced apart tracks 25 that extend throughout the length of the machine. The carriages 23 are provided with an upstanding rib 15 that is reduced at its upper end to form seats 16 for the resting engagement of the ends of the pallets 14. The carriages 23 support the ends of the pallets 14 and the carriages and the pallets are thus conveyed through the machine at a constant speed. Rods 19 disposed upon opposite sides of the center line of the pallets 14, operate through tubular bearings 20, that are fixed to the underside of the pallets 14 and the rods 19 extend downwardly below the bearings 20 for progressive contacting engagement with elevating trackways 21 that extend through the machine beneath the multiple lines of pallets and carriages and constitute means for elevating elongated insert strips 46 that are seated within beveled openings 45 of each pallet and whereby the strips 46 are flush normally with the surface of the pallet. The rods 19, extending through the bearings 20 are welded or otherwise connected to the strips 46 and whereby, the rods 19 engage the tracks 21 so that the tile molded upon the pallets are progressively elevated as they approach the discharge end of the machine. The lower ends of each longitudinal pair of rods 19, shown more particularly in FIGURES 2 and 3 are rigidly connected together by a rigid bar 22 thus, the molded tile is progressively elevated by the engagement of the lower ends of the rods 19 and the bars 22 upon the tracks 21, as the molded tile is progressively conveyed through the machine.

Inwardly from the entrance end of the machine there has been provided a conventional hopper 26 through which the pallets pass and whereby the pallets are filled with the fluent material such as cement. Spaced from the hopper 26 is a spray housing 27 through which the loaded pallets pass and whereby to coat the tile with the paint or other coloring medium. Between the hoppers 26 and 27, there has been provided a vibrator 28 and whereby the tile is vibrated prior to the entrance to the paint housing. The hoppers 26 and 27 and the vibrator 28 are suitably supported upon an elevated frame 29.

As shown in FIGURE 4, the tracks 21 are divided at 30, placing the entrance end of the trackway and the extension of the trackway at different levels and with the trackway section 21a being disposed at a lower level with respect to the trackway entrance section 21' so that as the pallet bars 22 move around the entrance end of the machine, they pass through the loading hopper 26 and then drop downwardly to the lower trackway 21a, causing the fluent material to pack into the pallets. The track 21a and its continued section 21 continues forwardly and the machine at a constant level and then elevated progressively as the track 21a extends through the curing oven indicated at 31 so that the tile are progressively elevated by the rods 19 and the strips 46 and so that the molded tile, indicated by the letter "T" is properly cured as it passes through the oven and toward the discharge end of the machine. Also disposed within the length of the trackways 21a, there has been provided a vibrator 32, the upper surface of which is in alignment with the upper surfaces of the track sections 21a. The vibrator 32 may be of any desirable configuration or construction and preferably is vibrated by eccentrics 33 in any well known manner. The vibrator 32 is of such length that it will simultaneously vibrate at least two pallets and, as shown in FIGURE 5, the bars 22 and the rods 19 slidably engage the surface of the vibrator 32. The tracks 21a and 21' terminate at the discharge end of the machine and at the entrance end of the machine, where the ends of the trackways are curved around the drive shafts 7 and 8, concentric thereto, as indicated at 34 and whereby the bars 22 will slide around the curved ends of the tracks in an even uninterrupted manner. The return flight of the chains 11 carry the pallets and the carriages through the machine to the entrance end, with the strips 46 in the elevated position or in a suspended position and, as the pallets engage the curve section of track indicated at 34, the bars 22 engage the curve section of track and continue upon the tracks 21a to the position where the tracks are interrupted at the point 30 and the strips then fall downwardly by gravity, as the bars 22 drop to the lower level of the track 21a, positioning the strips 46 flush with the pallets 14. This is prior to the entrance end of the pallets to the filling hopper 26.

Referring now to FIGURE 6, there has been illustrated a take-off arcuate conveyor 36. The take-off conveyor 36 is provided with a backing belt 39 upon which is fixed a multiplicity of closely arranged and preferably sponge rubber sections 40. The conveyor 36 is power driven in any desirable manner and preferably at a speed constant with respect to the speed of the chains 11. As the carriages reach the discharge end of the machine, the tile, indicated at "T" in FIGURE 6 has been elevated above the pallets 14 and, as the carriages and the elevated pallet strips 46 approached the curve end 34 of the track 21 move around the discharge end of the track 21, the tile is progressively shifted upon the endless conveyor belt 36 and travels upon the conveyor 36 around and along the horizontal conveyor indicated at 41 beneath the machine. Upon reaching the end of the horizontal conveyor section 41, the tile is shifted onto an endless conveyor belt 42 that is driven from a shaft 43 in any desirable manner. The general outline and operation of the device so far described is similar in certain respect to my co-pending application above identified. The description so far refers to a single group of carriages, pallets and elevating strips, having the elevating rods 19 and the bars 22 that traverse the elevating trackways 21.

With respect to FIGURES 7 and 8, a plurality of spaced apart parallel chain conveyors 44 have been illustrated for the multiple simultaneous production of at least four rows of pallets supported by the conveyors 44. The outermost conveyors are supported upon the tracks 25 carried upon rigid frame members 25a. The transverse frame members 23, constituting the carriage is now extended entirely across the group of conveyors 44, carrying the pallet heads 17 and the pallets 14. The frame 23a at opposite ends is supported upon the tracks 25 by grooved rollers 24 and the frame 23a is sufficiently rigid to make it unnecessary to provide tracks 25 for the intermediate pallet carrier 17. This multiple group of pallet carriers and pallets embody substantially the same construction as that illustrated in FIGURE 3 wherein a plurality of elevating rods 19 engage the progressively incline tracks 21. For the two intermediate pallet carriers, there has been provided similar inclined tracks 21a. Drive sprockets 9 and 10 are also positioned upon the shafts 7 and 8 whereby all of the chain conveyors are simultaneously driven at a constant speed. The frame 23a constitutes a rigid support for the pallets whereby the pallets are supported in their traverse through the machine upon the tracks 25 and provides an apparatus for molding a multiple row of tiles simultaneously through the medium of the conveyors 44. The rods 19, as in the first form of the invention are tied together at their lower ends by the bars 22, being substantially the same construction as first disclosed. Each of the trackways 21a are provided with concentric curved extensions at their opposite ends, providing for the free sliding movement of the bars 22 from the entrance end of the machine to the discharge end of the machine and the arcuate conveyor 36 will obviously be sufficiently wide to receive the multiple rows of tiles. Substantially, the pallet heads 17 each support a transverse line of pallets 14 and, as shown in FIGURE 3 the rods 19 are biased upwardly by their engagement with the tracks 21 and 21a. Such a construction has been disclosed in my copending application above identified.

In the use of the device, see particularly FIGURE 4, the pallets and pallet carriers carried by the chain conveyor 12 has a return movement beneath the upper flight of the chain 11 and since the tile has been discharged onto the conveyor 36, the pallets and pallet carriers have been elevated and the pallets and pallet carriers remain in such elevated position throughout the travel beneath the upper flight of the chains 11 and as shown in FIGURES 4 and 6, they travel in such position until they again reach the entrance end of the machine, shown in FIGURE 4 where the bars 22 override the curve sections of the tracks 21 and 21a, so that the pallet and pallet carriers are again disposed in a leading position at the entrance end of the machine and, at the brake point 30, the weight of the pallets and pallet carriers cause the bars 19 to drop downwardly for engagement with the track section 21a and from that point on, they pass through the hopper 26, the coating device 27 and the curing oven 31 and thus are elevated prior to the entrance to the oven and continue in such elevated position until the tiles reach the discharge end of the machine, where they are deposited upon the arcuate conveyor belt 36, see particularly FIGURE 6.

It will be apparent from the foregoing that a very novel arrangement has been made for the continuous and uninterrupted manufacture of molded tile or the like. The structure illustrated in FIGURES 2 and 3 is identical to that illustrated in FIGURES 7 and 8, where in a multiplicity of conveyors carry the tile heads and the pallets for movement through the machine but identically to that first described. The tile is molded upon the pallet 18 and these several pallets may be provided with cut-out openings 45 and with the openings having beveled edges that receive inserts 46 and whereby the inserts are disposed flush with the pallets 18. The rods 19 are fixedly connected to the inserts and, as the tiles are conducted through the machine after molding, the rods 19 cause the inserts to be elevated by the inclination of the tracks 21 thus, the tile, as it leaves the oven is elevated and supported upon the inserts 46 to be subsequently discharged upon the conveyor 36 where they are conducted downwardly and beneath the machine, as illustrated in FIGURE 6 for deposit upon the lateral conveyor 42. The device is extremely simple, strong, durable and most effective for the production of cement or clay tiles in a continuous manner either in a single row or in multiple rows as illustrated in FIGURES 7 and 8.

It is to be understood that the invention is not limited to the precise construction shown, but that changes are contemplated as readily fall within the spirit of the invention as shall be determined by the scope of the subjoined claims.

I claim:

1. A tile forming machine of the character described comprising end frame members, shafts journaled in bearings upon the frame members at each end of the machine, sprockets carried upon the shafts for supporting and driving endless conveyor chains, means for driving either of the shafts, trackways supported by the frame members, carriages having grooved wheels at their opposite ends whereby the carriages are adapted to traverse the trackways, pallet supporting means fixed to each of the carriages and with the pallets adapted to rest at its opposite ends upon the pallet supporting means of adjacent carriages, each of the pallets being provided with longitudinal slots and elevating strips adapted to engage in the slots to be flush with the surface of the pallets, the device being provided with spaced apart inclined elevating tracks, the elevating means for the strips comprising elevating rods connected by bars at their lower ends and which rods and bars engage the second named tracks and whereby the strips elevate the tile above the pallet, the rods at their lower ends being rigidly connected together by said bars so that the rods are jointly elevated, a filling hopper for loading the pallets with fluent material, a vibrator for the loaded pallets across which the rods and bars are slidably moved, a coating device for the tile after vibrating, a curing oven through which the tile travels in its passage through the machine and an arcuate take-off conveyor for receiving the tile from the strips as it passes around the arc of the shaft at the discharge end of the machine.

2. A tile forming machine comprising, a conveyor including endless chains, a cross shaft at the opposite ends of the machine, sprockets on the cross shafts engaging and driving the chains, one of the shafts being power driven, trackways extending for the length of the machine, carriages adapted to traverse the trackways, supports fixed to the chains, a pallet fixed to each support, each pallet having apertures, elevator strips fitting into the apertures, rods attached to said strips, guides on the pallets through which the rods extend and through which they are slidably movable, bars extending between and connecting the rods which extend through each pallet, said bars being located to limit the sliding movement of the rods through their guides, the ends of the rods and the bars which connect the same riding on the trackways, the trackways being inclined toward one end of the machine so that the rods and their connecting bars will elevate the elevator strips and cause the strips to rise above the surfaces of the pallets and elevate the tiles resting thereon, a vibrator having a plane upper surface, the ends of the rods and the bars which connect the same being slidably moved across said upper surface during the travel of the pallets toward the discharge end of the machine.

3. In a tile forming machine, conveyor chains, pallets carried thereby, each pallet having apertures, elevator strips fitted in said apertures, rods extending from the elevator strips, sleeves extending from the pallets and through which the rods are slidably guided, bars extending between the rods for each pallet, said bars acting to limit the sliding movement of the rods through their guides, a vibrator presenting a plane upper face below a stretch of the chains, the bars riding across said face of the vibrator during movement of the chains whereby a plurality of the pallets will be vibrated while in travel by the chains.

References Cited by the Examiner

UNITED STATES PATENTS

| Re. 16,076 | 5/1925 | Crouch | 25—99 |
| 1,387,175 | 8/1921 | Price | 25—41 |
| 1,534,361 | 4/1925 | Craig | 25—99 |
| 1,908,640 | 5/1933 | Dunn | 25—99 |
| 2,494,212 | 1/1950 | Spriggs et al. | 25—41 |
| 2,664,592 | 1/1954 | Ingraham et al. | 25—99 |
| 2,757,415 | 8/1956 | Mathues et al. | 25—99 |
| 3,176,372 | 4/1965 | Lang | 25—99 |

J. SPENCER OVERHOLSER, *Primary Examiner.*

G. A. KAP, *Assistant Examiner.*